(12) United States Patent
Numata

(10) Patent No.: US 6,382,078 B1
(45) Date of Patent: May 7, 2002

(54) ATTACHMENT STRUCTURE FOR BRAKE-EQUIPPED CYLINDER

(75) Inventor: Masayuki Numata, Abiko (JP)

(73) Assignee: SMC Kabushiki Kaisha, Tokyo (JP)

( * ) Notice: Subject to any disclaimer, the term of this patent is extended or adjusted under 35 U.S.C. 154(b) by 0 days.

(21) Appl. No.: 09/504,801

(22) Filed: Feb. 15, 2000

(30) Foreign Application Priority Data

Mar. 5, 1999 (JP) .......................................... 11-058892

(51) Int. Cl.[7] ................................................ F15B 15/26
(52) U.S. Cl. ................................ 92/19; 92/23; 92/161; 92/169.1; 411/383; 411/395
(58) Field of Search ................... 92/18, 19, 23, 92/24, 161, 171.1; 411/383, 384, 395

(56) References Cited

U.S. PATENT DOCUMENTS 1,172,406 A * 2/1916 Taylor .......................... 411/395
2,632,425 A * 3/1953 Grover ............................ 92/28
4,402,255 A * 9/1983 Fink et al. ...................... 92/161

FOREIGN PATENT DOCUMENTS

| DE | 1 210 283 | 2/1966 |
| DE | 28 12 927 | 10/1979 |
| DE | 195 43 471 | 1/1997 |
| GB | 2 017 224 | 10/1979 |

\* cited by examiner

*Primary Examiner*—F. Daniel Lopez
(74) *Attorney, Agent, or Firm*—Oblon, Spivak, McClelland, Maier & Neustadt, P.C.

(57) ABSTRACT

Disclosed is an attachment structure for a brake-equipped cylinder, comprising a through-hole-equipped bolt formed with a through-hole penetrating therethrough in an axial direction, for integrally joining a main cylinder body and a brake section by being screwed into an attachment hole penetrating through a cylinder tube and a lock body; and an attachment bolt for fixing the main cylinder body and the brake section which are integrally joined to one another, to a wall surface by being inserted through the through-hole.

7 Claims, 6 Drawing Sheets

ATTACHMENT SURFACE

ATTACHMENT STRUCTURE FOR BRAKE-EQUIPPED CYLINDER

BACKGROUND OF THE INVENTION

1. Field of the Invention

The present invention relates to an attachment structure for a brake-equipped cylinder, which makes it possible to conveniently attach the brake-equipped cylinder, for example, to another member or a wall surface.

2. Description of the Related Art

The brake-equipped cylinder has been hitherto used, for example, to transport or position a workpiece.

A brake-equipped cylinder concerning the conventional technique is shown in FIG. 6.

This brake-equipped cylinder comprises a main cylinder body 2 including an unillustrated piston accommodated in a cylinder tube 1, and a brake section 4 integrally coupled to the main cylinder body 2, for braking a piston rod 3 at a predetermined position.

Penetrating attachment holes 5 are formed at four corners of the cylinder tube 1. Tie rods 6 are inserted into the attachment holes 5 respectively. The main cylinder body 2 and the brake section 4 are integrally coupled to one another by the aid of pairs of nuts 7a, 7b which are engaged with both ends of the tie rods 6 respectively.

Explanation will be made for a case in which the brake-equipped cylinder is attached to a plate member 8.

Penetrating bores 9 are bored through the plate member 8. Screw members 9a are inserted into the bores 9 from the surface on the side opposite to the attachment surface of the brake-equipped cylinder. The screw members 9a are screwed into female thread sections formed on the inner circumferential surfaces of the nuts 7b. Accordingly, the brake-equipped cylinder is fixed to the plate member 8.

However, in the case of the brake-equipped cylinder concerning the conventional technique, when the screw members cannot be inserted from the surface opposite to the attachment surface, for example, when an unillustrated wall surface is used as an attachment surface, it is difficult to directly attach the brake-equipped cylinder. In such a situation, it is necessary to use any attachment fixture such as an unillustrated bracket. Therefore, inconveniences arise in that the attachment operation is complicated, the number of parts is increased, and the production cost becomes expensive.

SUMMARY OF THE INVENTION

A general object of the present invention is to provide an attachment structure for a brake-equipped cylinder, which makes it possible to realize convenient attachment operation when the brake-equipped cylinder is attached, for example, to another member or a wall surface.

A principal object of the present invention is to provide an attachment structure for a brake-equipped cylinder, which makes it possible to decrease the number of parts and reduce the production cost by abolishing any attachment fixture such as a bracket.

The above and other objects, features, and advantages of the present invention will become more apparent from the following description when taken in conjunction with the accompanying drawings in which a preferred embodiment of the present invention is shown by way of illustrative example.

DESCRIPTION OF THE PREFERRED EMBODIMENTS

Figure 1:
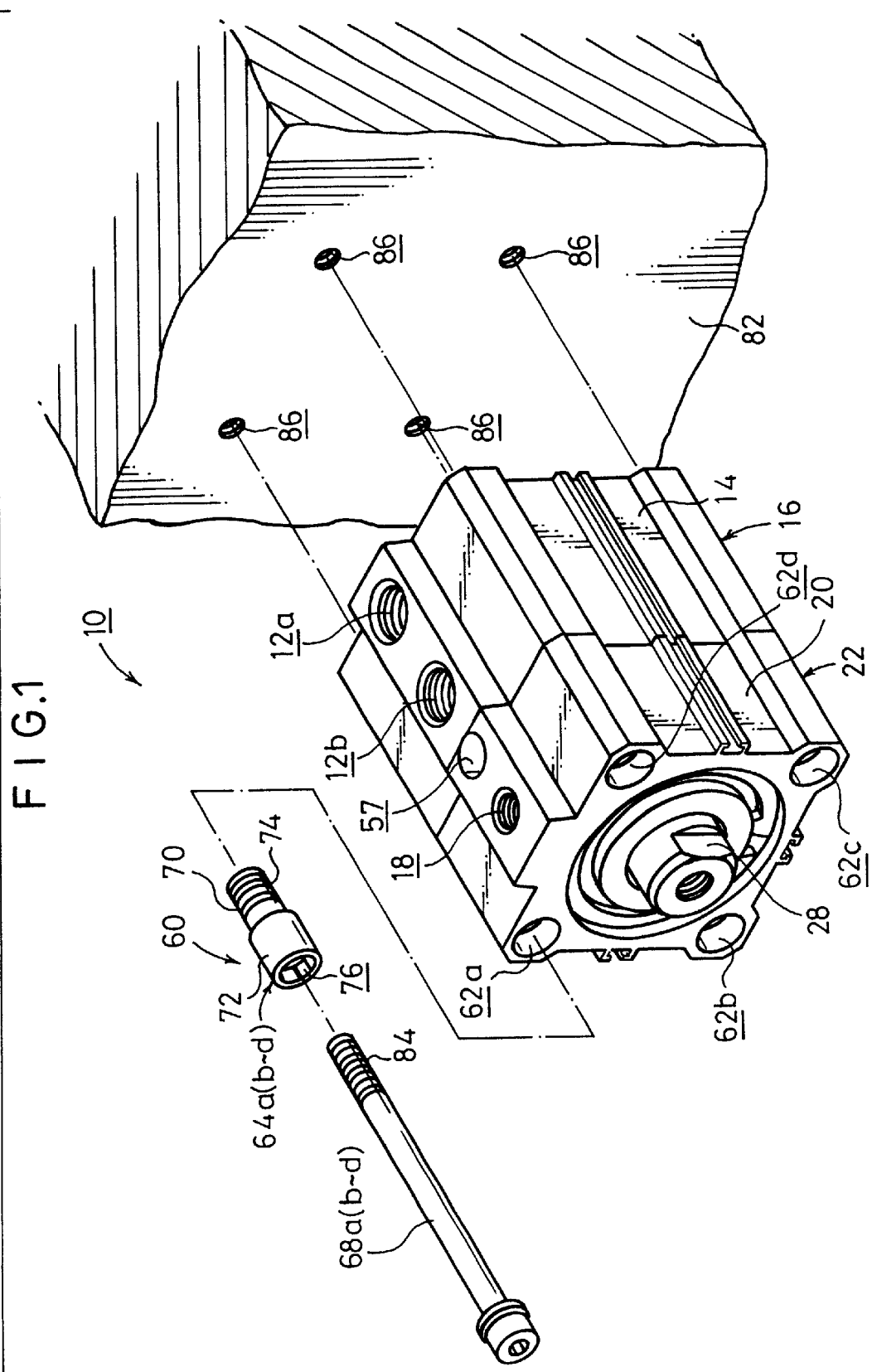
FIG. 1 shows an exploded perspective view illustrating an attachment mechanism for constructing a cylinder apparatus to which an attachment structure for a brake-equipped cylinder according to an embodiment of the present invention is applied.
Figure 2:
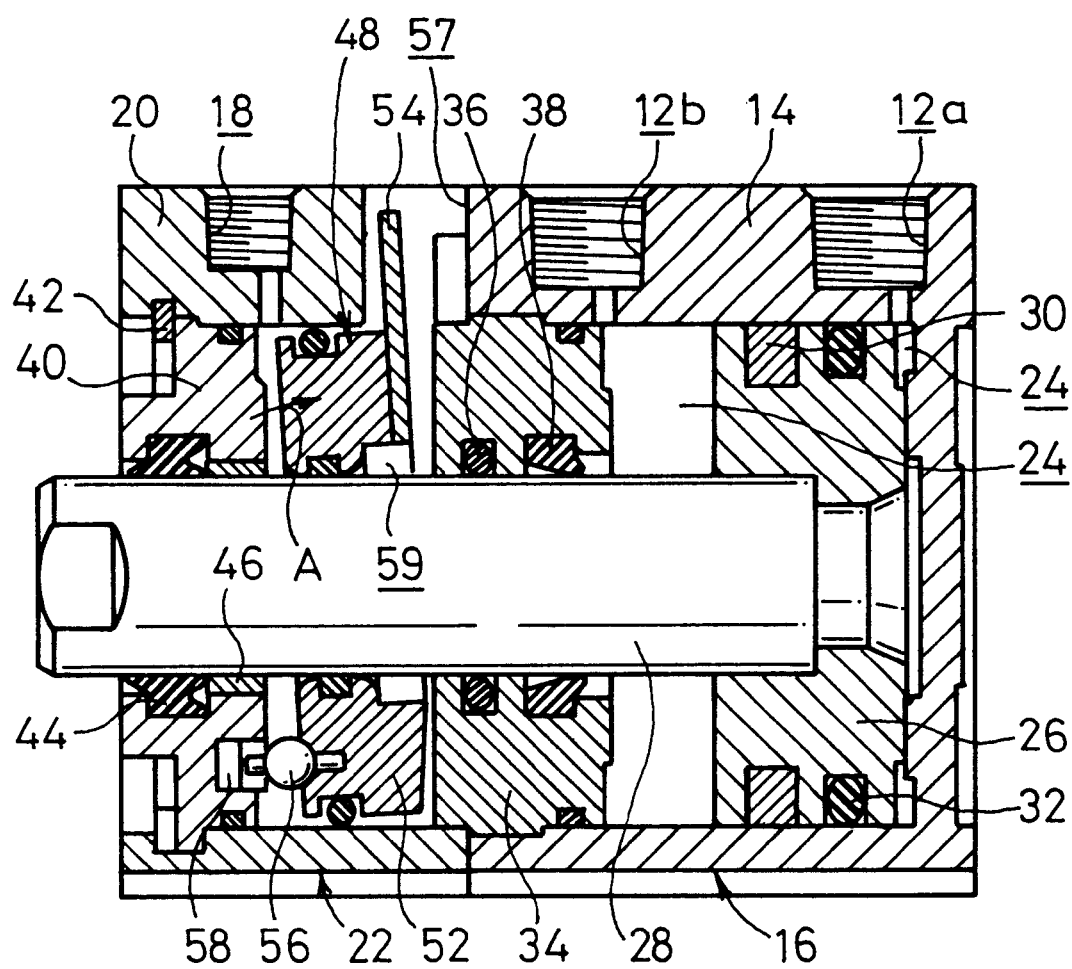
FIG. 2 shows a longitudinal sectional view taken in an axial direction of the cylinder apparatus.

With reference to FIGS. 1 and 2, reference numeral 10 indicates a cylinder apparatus to which an attachment structure for a brake-equipped cylinder according to an embodiment of the present invention is applied.

The cylinder apparatus 10 comprises a main cylinder body 16 which has a pair of pressure fluid inlet/outlet ports 12a, 12b separated from each other by a predetermined spacing distance, and a brake section 22 which is integrally coupled to the main cylinder body 16 and which has a lock body 22 formed with a brake-releasing pressure fluid port 18.

The cylinder tube 14 and the lock body 20 are preferably made of a metal material such as an aluminum alloy having a surface treated with hard alumite.

As shown in FIG. 2, the main cylinder body 16 includes a piston 26 which makes linear sliding movement along a cylinder chamber 24 formed in the cylinder tube 14, a piston rod 28 which is coupled to a substantially central portion of the piston 26, and a ring-shaped magnet 30 and a piston packing 32 which are installed to annular grooves formed on the outer circumferential surface of the piston 26.

A collar member 34, which substantially forms the cylinder chamber 24, is fixed to the cylinder tube 14. A rod packing 36 and a scraper 38 are installed to annular grooves formed at sliding portions of the collar member 34 and the piston rod 28.

A rod cover 40 for surrounding the piston rod 28 is installed to the brake section 22 by the aid of a retaining ring 42. A rod packing 44 and a bush 46 are provided at sliding portions of the rod cover 40 and the piston rod 28.

A brake mechanism 48 is provided between the rod cover 40 and the collar member 34. The brake mechanism 48 includes a lock ring 52 which is tiltable by a predetermined angle in accordance with the resilient force of a spring member 50 (see FIG. 3), a lever 54 which is coupled to the lock ring 52, a pivot pin 56 which is installed to the lock ring 52, and a pivot key 58 which is fastened to the pivot pin 56. The pivot pin 56 functions as a supporting point when the lock ring 52 is tilted. The lever 54 is provided to release the brake lock by manually operating it through a manual operation hole 57.

Figure 3:
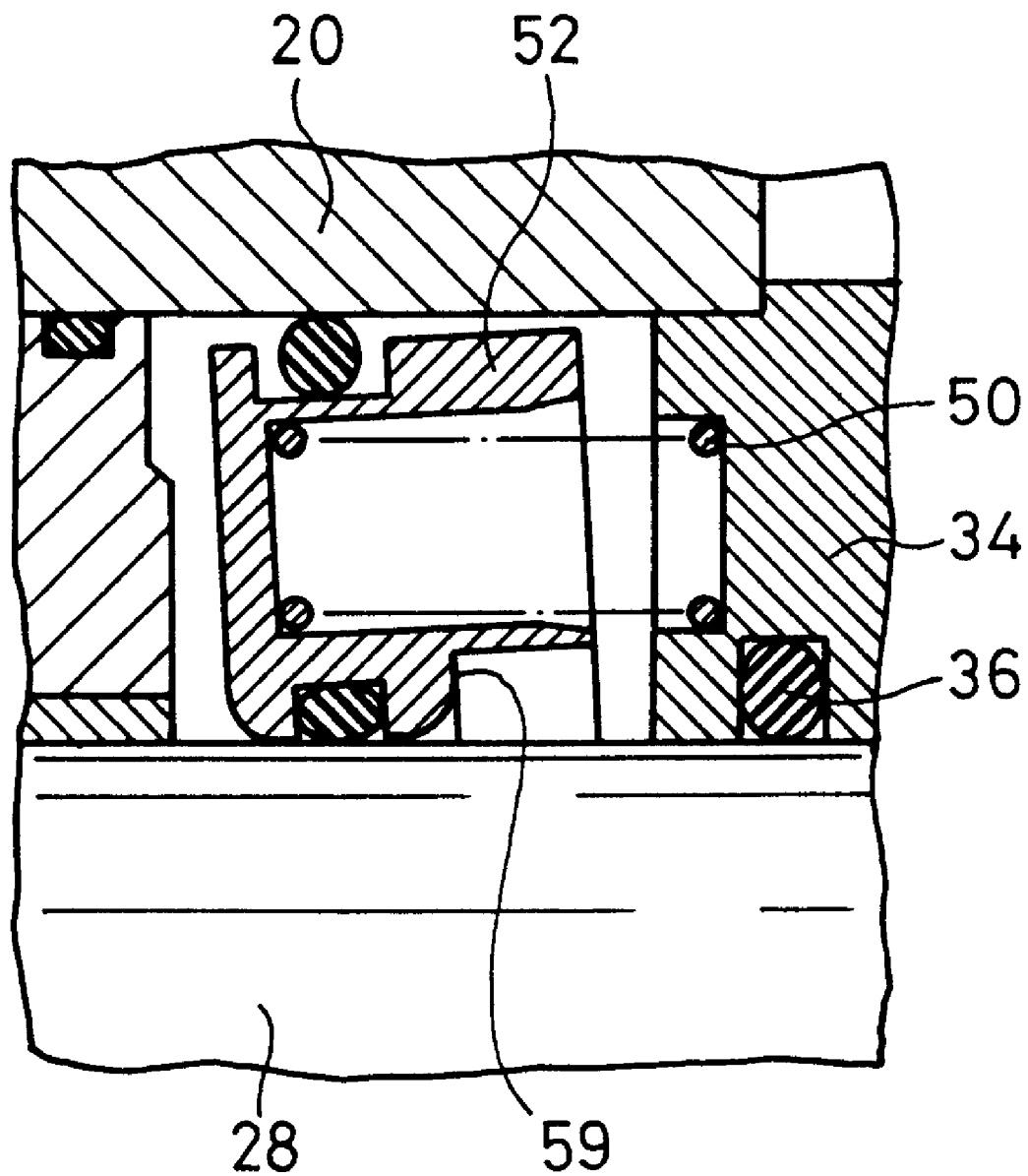
FIG. 3 shows a partial longitudinal sectional view illustrating a spring member provided in a brake mechanism, for pressing a lock ring.

An annular groove 59, which functions as a relief when the lock ring 52 is tilted, is formed on the inner circumferential surface of the lock ring 52 (see FIG. 3).

Next, explanation will be made for an attachment structure 60 which is provided for the cylinder apparatus 10 and which is used to fix the cylinder apparatus 10, for example, to another member or a wall surface.

Figure 4:
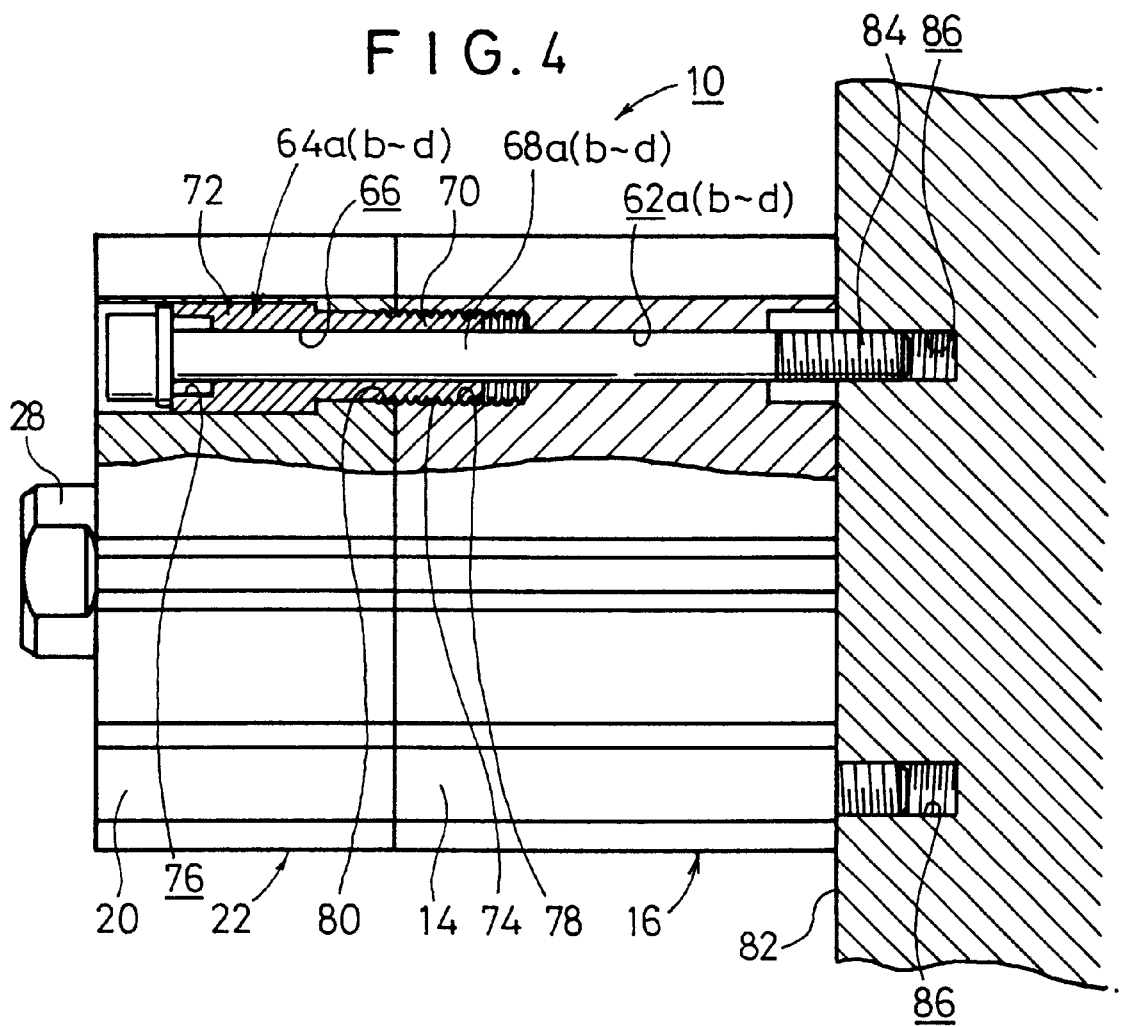
FIG. 4 shows, with partial cutout, a longitudinal sectional view illustrating a state in which the cylinder apparatus is fixed to a wall surface.

As shown in FIGS. 1 and 4, the attachment structure 60 includes four attachment holes 62a to 62d which are formed to penetrate through four corners of the cylinder tube 14 and the lock body 20 respectively, four through-hole-equipped bolts (coupling members) 64a to 64d which are screwed into the attachment holes 62a to 62d and which serve to integrally couple the main cylinder body 16 and the brake section 22 to one another, and four attachment bolts (attachment members) 68a to 68d which are inserted into penetrating through-holes 66 of the through-hole-equipped bolts 64a to 64d.

The attachment bolts 68a to 68d may be inserted into the attachment holes 62a to 62d from the side of the main cylinder body 16, or they may be inserted into the attachment holes 62a to 62d from the side of the brake section 22. The attachment bolts 68a to 68d are provided so that they may be inserted in any of the directions.

Each of the through-hole-equipped bolts 64a to 64d is made of a metal material, including a small diameter section 70 and a large diameter section 72 which are formed in an integrated manner. The through-hole-equipped bolt 64a to 64d has a male thread section 74 which is formed on the outer circumferential surface of the small diameter section 70, a hexagon socket 76 which is formed on the inner wall surface of the large diameter section 72, and the through-hole 66 which includes the hexagon socket 76 and which penetrates in the axial direction.

A first female thread section 78 is formed on the inner circumferential surface of the attachment hole 62a to 62d of the cylinder tube 14. A second female thread section 80, which is coaxial with the first female thread section 78 and which has approximately the same diameter as that of the first female thread section 78, is formed on the inner circumferential surface of the attachment hole 62a to 62d of the lock body 20. In this arrangement, the respective through-hole-equipped bolts 64a to 64d are inserted into the attachment holes 62a to 62d respectively, and the male thread sections 74 of the through-hole-equipped bolts 64a to 64d are screwed and engaged with the first and second female thread sections 78, 80 of the attachment holes 62a to 62d respectively. Accordingly, the main cylinder body 16 and the brake section 22 are tightly fixed to one another in an integrated manner. It is more preferable that an unillustrated hexagon wrench is inserted into the hexagon socket 76 formed in the large diameter section 72, and the through-hole-equipped bolt 64a to 64d is screwed by the aid of the hexagon wrench.

The cylinder apparatus 10, to which the attachment structure for the brake-equipped cylinder according to the embodiment of the present invention is applied, is basically constructed as described above. Next, its operation, function, and effect will be explained.

At first, explanation will be made for a case in which the cylinder apparatus 10 is directly attached to a wall surface. It is assumed that the main cylinder body 16 and the brake section 22 have been already fixed tightly in an integrated manner by the aid of the through-hole-equipped bolts 64a to 64d.

An operator, who works in front of the wall surface 82, inserts the four attachment bolts 68a to 68d into the attachment holes 62a to 62d which are formed at the four corners of the cylinder apparatus 10. The attachment bolts 68a to 68d are allowed to penetrate through the through-holes 66 of the through-hole-equipped bolts 64a to 64d so it that the thread sections 84, which are provided at the ends of the attachment bolts 68a to 68d, are screwed into screw holes 86 formed in the wall surface 82. Accordingly, the cylinder apparatus 10 is fixed to the wall surface 82 by the aid of the four attachment bolts 68a to 68d.

The attachment bolts 68a to 68d are designed such that they can be inserted into the attachment holes 62a to 62d in any of the directions. i.e., from the side of the main cylinder body 16 or from the side of the brake section 22.

Figure 5:
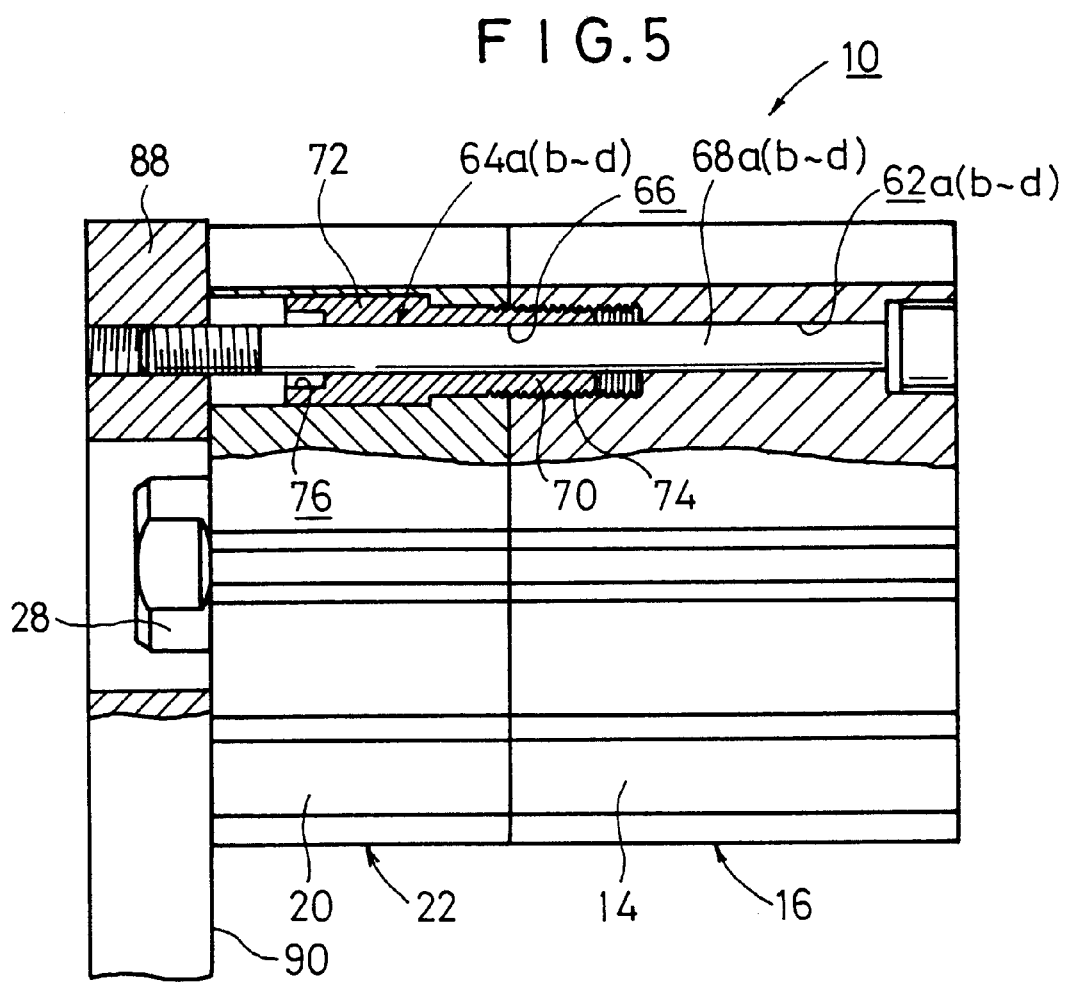
FIG. 5 shows, with partial cutout, a longitudinal sectional view illustrating a state in which the cylinder apparatus is fixed to an attachment surface of a plate member in a direction opposite to the direction used in FIG. 4.
Figure 6:
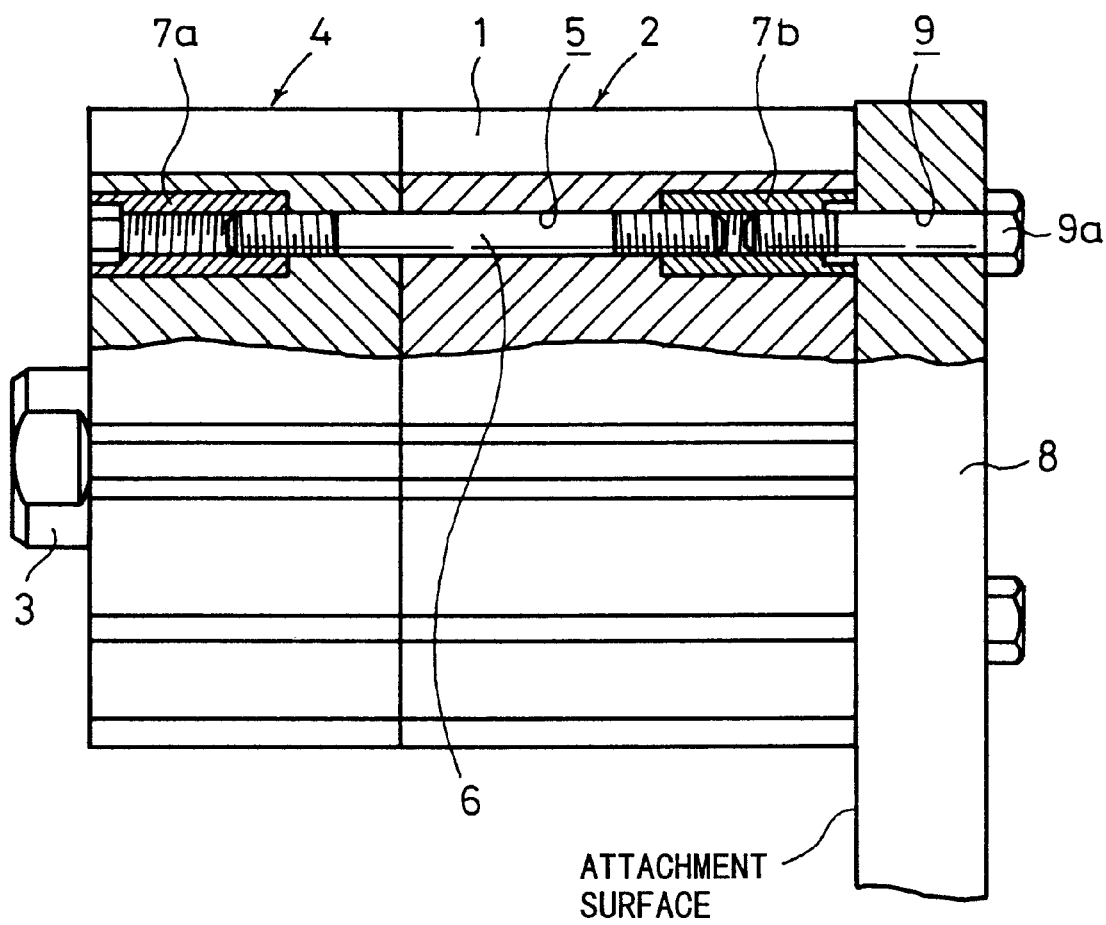
FIG. 6 shows, with partial cutout, a longitudinal sectional view illustrating a method for attaching a brake-equipped cylinder concerning the conventional technique.

Therefore, when the cylinder apparatus 10 is attached to the wall surface 82, any one of the following methods can be used, i.e., the method in which cylinder apparatus 10 is attached by allowing the main cylinder body 16 to make direct contact with the wall surface (see FIGS. 1 and 4), and the method in which the cylinder apparatus 10 is attached by allowing the brake section 22 to make contact with an attachment surface 90 of a plate member 88 (see FIG. 5).

In the case of the cylinder apparatus 10 according to the embodiment of the present invention, the attachment bolts 68a to 68d can be screwed in the same direction as the attachment direction through the penetrating through-holes 66 which are formed through the through-hole-equipped bolts 64a to 64d. Therefore, it is unnecessary that the attachment bolts 68a to 68d are screwed from the surface on the side opposite to the attachment surface as performed in the conventional technique. Thus, it is possible to conveniently perform the attachment operation.

When the cylinder apparatus 10 according to the embodiment of the present invention is attached to the wall surface 82, it is unnecessary to use any attachment fixture such as a bracket. Thus, it is possible to decrease the number of parts and reduce the production cost.

It is a matter of course that an unillustrated unit cover or the like to be appended to the cylinder apparatus 10 can be also fixed together.

Next, the operation of the cylinder apparatus 10 according to the embodiment of the present invention will be explained.

At first, the pair of pressure fluid inlet/outlet ports 12a, 12b and the brake-releasing pressure fluid port 18 are connected beforehand to a pressure fluid supply source (not shown) respectively via unillustrated tubes.

As shown in FIG. 2, it is assumed in the initial state that the piston rod 28 is in the locked state by means of the lock ring 52 which is tiltable by a predetermined angle.

In other words, a state is given, in which the lock ring 52 is tilted by a predetermined angle about the supporting point of the pivot pin 56 in accordance with the resilient force of the spring member 50. As a result, the piston rod 28 is locked by being fastened at the outer circumferential surface of the piston rod 28 by means of the lock ring 52.

In order to release the lock effected by the brake mechanism 48, an unillustrated directional control valve is switched to supply the pressure fluid from the brake-releasing pressure fluid port 18. The lock ring 52 is pressed in the direction of the arrow A (see FIG. 2) against the resilient force of the spring member 50 in accordance with the action of the pressure fluid supplied from the brake-releasing pressure fluid port 18, giving a state in which the lock ring 52 is substantially perpendicular to the axis of the piston rod 28. Thus, the lock effected by the brake mechanism 48 is released.

In the state in which the lock effected by the brake mechanism 48 is released as described above, the pressure fluid is supplied to the cylinder chamber 24 via the first pressure fluid inlet/outlet port 12a. The piston 26 is pressed in accordance with the action of the pressure fluid supplied to the cylinder chamber 24, and the piston 26 makes sliding movement along the cylinder chamber 24. As a result, the piston 26 and the piston rod 28 are displaced in an integrated manner. In this process, the piston 26 arrives at the displacement terminal position when the piston 26 abuts against the collar member 34, Accordingly, the displacement of the piston 26 is restricted.

Subsequently, the unillustrated directional control valve is switched to supply the pressure fluid from the second pressure fluid inlet/outlet port 12b. Accordingly, the piston 26 is displaced in the direction opposite to the previous direction, and it is restored to the initial state. The supply of the pressure fluid to the brake-releasing pressure fluid port 18 is stopped by operating and switching the unillustrated directional control valve so that the brake-releasing pressure fluid port 18 is open to the atmospheric air. Therefore, the lock ring 52 is tilted about the supporting point of the pivot pin 56 in accordance with the resilient force of the spring member 50. As a result, the brake mechanism 48 is operated to give the initial state in which the piston rod 28 is locked.

What is claimed is:

1. An attachment structure for a brake-equipped cylinder, comprising:

a main cylinder body having a piston for making the sliding movement along a cylinder chamber formed in a cylinder tube, and a piston rod with its one end fastened to said piston;

a brake section having a lock body coupled to said cylinder tube and including a brake mechanism for fastening said piston rod;

a coupling member comprising a through-hole-equipped bolt having an externally threaded small diameter section and a large diameter section and being formed with a through hole penetrating completely through said coupling member in an axial direction thereof, for integrally joining said main cylinder body and said brake section by being screwed into an attachment hole, said attachment hole penetrating through said cylinder tube and said lock body extending over an entire longitudinal distance of said main cylinder body and said brake section, said externally threaded section threaded engaging with both said main cylinder body and said brake section; and an attachment member for fixing said main cylinder body and said brake section which are integrally joined to one another, to another member or a wall surface by insertion of said attachment member through said through hole formed in said coupling member and threaded attachment of said attachment member to said other member or said wall surface.

2. The attachment structure for said brake-equipped cylinder according to claim 1, wherein said through-hole-equipped bolt is integrally formed with said small diameter section and said large diameter section and has a male thread section formed on an outer circumferential surface of said small diameter section, an angular socket formed on an inner wall surface of said large diameter section, and said through-hole including said angular socket and penetrating through said through-hole-equipped bolt in said axial direction.

3. The attachment structure for said brake-equipped cylinder according to claim 2, wherein a first female thread section for engaging with said male thread section of said through-hole-equipped bolt is formed on said main cylinder body, a second female thread section for engaging with said male thread section of said through-hole-equipped bolt is formed on said brake section, and said first and second female thread sections are provided coaxially to have a substantially identical diameter.

4. The attachment structure for said brake-equipped cylinder according to claim 1, wherein said attachment member is composed of a lengthy attachment bolt for being inserted through said through-hole to penetrate through said through-hole.

5. The attachment structure for said brake-equipped cylinder according to claim 4, wherein said attachment bolt is capable of being inserted in any one of directions into said attachment hole from a side of said main cylinder body or into said attachment hole from a side of said brake section.

6. The attachment structure for said brake-equipped cylinder according to claim 1, wherein said brake mechanism has a pivot pin, a lock ring for fastening and locking an outer circumferential surface of said piston rod by being tilted about a supporting point of said pivot pin, and a spring member for urging said lock ring in a direction to fasten said piston rod.

7. The attachment structure for said brake-equipped cylinder according to claim 1, wherein said attachment holes are provided at four places in the vicinity of four corners of said cylinder tube and said lock body which are integrally coupled to one another, and said coupling members and said attachment members are provided as a plurality of individuals corresponding to said attachment holes.

* * * * *